(12) United States Patent
Eun et al.

(10) Patent No.: US 11,094,256 B2
(45) Date of Patent: Aug. 17, 2021

(54) DISPLAY DEVICE AND DRIVING METHOD THEREOF

(71) Applicant: Samsung Display Co., Ltd., Yongin-si (KR)

(72) Inventors: Hee Kwon Eun, Yongin-si (KR); Young Min Bae, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/542,188

(22) Filed: Aug. 15, 2019

(65) Prior Publication Data

US 2020/0135102 A1  Apr. 30, 2020

(30) Foreign Application Priority Data

Oct. 30, 2018 (KR) .................. 10-2018-0131149

(51) Int. Cl.
*G09G 3/3241* (2016.01)
*G06F 3/14* (2006.01)

(52) U.S. Cl.
CPC ............. *G09G 3/3241* (2013.01); *G06F 3/14* (2013.01); *G09G 2310/08* (2013.01); *G09G 2360/16* (2013.01)

(58) Field of Classification Search
CPC ............. G09G 3/3241; G09G 2310/08; G09G 2360/16; G06F 3/14
See application file for complete search history.

(56) References Cited

U.S. PATENT DOCUMENTS

| 8,970,642 B2 | 3/2015 | An et al. | |
|---|---|---|---|
| 2016/0118022 A1* | 4/2016 | Chun | G09G 3/2007 345/690 |
| 2016/0314761 A1* | 10/2016 | Kim | G09G 5/10 |
| 2016/0365037 A1* | 12/2016 | Gu | G09G 3/3291 |
| 2017/0039997 A1 | 2/2017 | An et al. | |
| 2017/0103707 A1* | 4/2017 | Park | G09G 3/2003 |
| 2017/0270841 A1 | 9/2017 | An et al. | |

FOREIGN PATENT DOCUMENTS

| KR | 10-2013-0055256 A | 5/2013 |
|---|---|---|
| KR | 10-2017-0018131 A | 2/2017 |
| KR | 10-2017-0098119 A | 8/2017 |
| KR | 10-2017-0108182 A | 9/2017 |
| KR | 10-2018-0015370 A | 2/2018 |

* cited by examiner

*Primary Examiner* — Chanh D Nguyen
*Assistant Examiner* — Ngan T. Pham-Lu
(74) *Attorney, Agent, or Firm* — Lewis Roca Rothgerber Christie LLP

(57) ABSTRACT

A display device and a driving method thereof are provided. The display device includes: a display panel including a plurality of pixels; a timing controller for calculating an On-Pixel Ratio (OPR) of input image data with respect to an arbitrary frame, and correcting the input image data, based on the OPR; and a data driver for generating a data signal, based on the corrected image data, and providing the data signal to the display panel. The OPRs are calculated in units of pixel rows.

15 Claims, 4 Drawing Sheets

DISPLAY DEVICE AND DRIVING METHOD THEREOF

CROSS-REFERENCE TO RELATED APPLICATION

This application claims priority to and the benefit of Korean patent application 10-2018-0131149 filed on Oct. 30, 2018 in the Korean Intellectual Property Office (KIPO), the entire disclosure of which is incorporated herein by reference.

BACKGROUND

1. Field

The present disclosure generally relates to a display device and a driving method thereof.

2. Description of the Related Art

A display device may display an image based on input image data. The display device calculates an On-Pixel Ratio (OPR) (or driving amount), and modulates (or reduces) input data based on the OPR to reduce the power consumption of the display device. This is referred to as an Auto Current Limit (ACL) function.

ACL generally requires a period of at least one frame to calculate an OPR of input image data when the ACL is initially applied. Since the ACL is not applied during this period, the power consumption is not efficiently reduced, and a display panel off phenomenon due to an occurrence of overcurrent may occur.

SUMMARY

Embodiments provide a display device for calculating on-pixel ratios in units of pixel columns and applying an auto current limit, based on the on-pixel ratios, and a driving method of the display device.

According to an aspect of the present disclosure, a display device is provided that includes: a display panel having a plurality of pixels; a timing controller configured to calculate an On-Pixel Ratio (OPR) of input image data with respect to an arbitrary frame, and to correct the input image data, based on the OPR; and a data driver configured to generate a data signal based on the corrected image data, and provide the data signal to the display panel, wherein the OPRs are calculated in units of pixel rows.

The timing controller may calculate an OPR of the input image data with respect to N pixel rows and correct the input image data, based on the calculated OPR, wherein N is a natural number of 2 or more).

N may be set to a value corresponding to a half of all the pixel rows of the display panel.

The timing controller may be configured to correct the input image data and provide the corrected image data to the data driver when the OPR is larger than a reference OPR.

The timing controller may not correct the input image data but provide the input image data to the data driver when the OPR is not larger than the reference OPR.

The arbitrary frame may be a first frame of an image to be displayed on the display panel.

The timing controller may be configured to correct the input image data, based on an OPR calculated in an (i-1)th frame with respect to an ith frame after the first frame, wherein i is a natural number of 2 or more.

The timing controller may be configured to correct the input image data based on whether the OPR is larger than a first reference OPR for the first frame and to correct the input image data, based on whether the OPR is larger than a second reference OPR for the ith frame.

According to another aspect of the present disclosure, there is provided a method for driving a display device having a display panel having a plurality of pixels, the method including: calculating On-Pixel Ratios (OPRs) of input image data with respect to an arbitrary frame in units of pixel rows; correcting the input image data, based on the OPRs; and providing a data signal corresponding to the corrected image data to the display panel.

The correcting of the input image data may include: determining whether an OPR of the input image data with respect to N pixel rows has been calculated, wherein (N is a natural number of 2 or more); and when the OPR of the input image data with respect to the N pixel rows is calculated, correcting the input image data, based on the OPR.

The N may be a natural number corresponding to a half of all the pixel rows of the display panel.

The correcting of the input image data may include: determining whether the OPR is larger than a reference OPR; and when the OPR is larger than the reference OPR, correcting the input image data and providing the corrected image data to the display panel.

The correcting of the input image data may include: determining whether the OPR is larger than a reference OPR; and providing the input image data to the display panel without correcting the input image data when the OPR is not larger than the reference OPR.

The correcting of the input image data may include: when the arbitrary frame is a first frame of an image to be displayed on the display panel, calculating the OPRs in units of pixel rows; and when the arbitrary frame is not the first frame, calculating OPRs in units of frames.

The correcting of the input image data may include: correcting the input image data, based on an OPR calculated with respect to the N pixel rows in the arbitrary frame when the arbitrary frame is the first frame; and correcting the input image data, based on an OPR calculated in a frame before the arbitrary frame when the arbitrary frame is not the first frame.

The correcting of the input image data may include: correcting the input image data, based on whether the OPR calculated with respect to the N pixel rows in the arbitrary frame is larger than a first reference OPR when the arbitrary frame is the first frame; and correcting the input image data, based on whether the OPR calculated with respect to the N pixel rows in the arbitrary frame is larger than a second reference OPR when the arbitrary frame is not the first frame.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it

DETAILED DESCRIPTION

Figure 1:
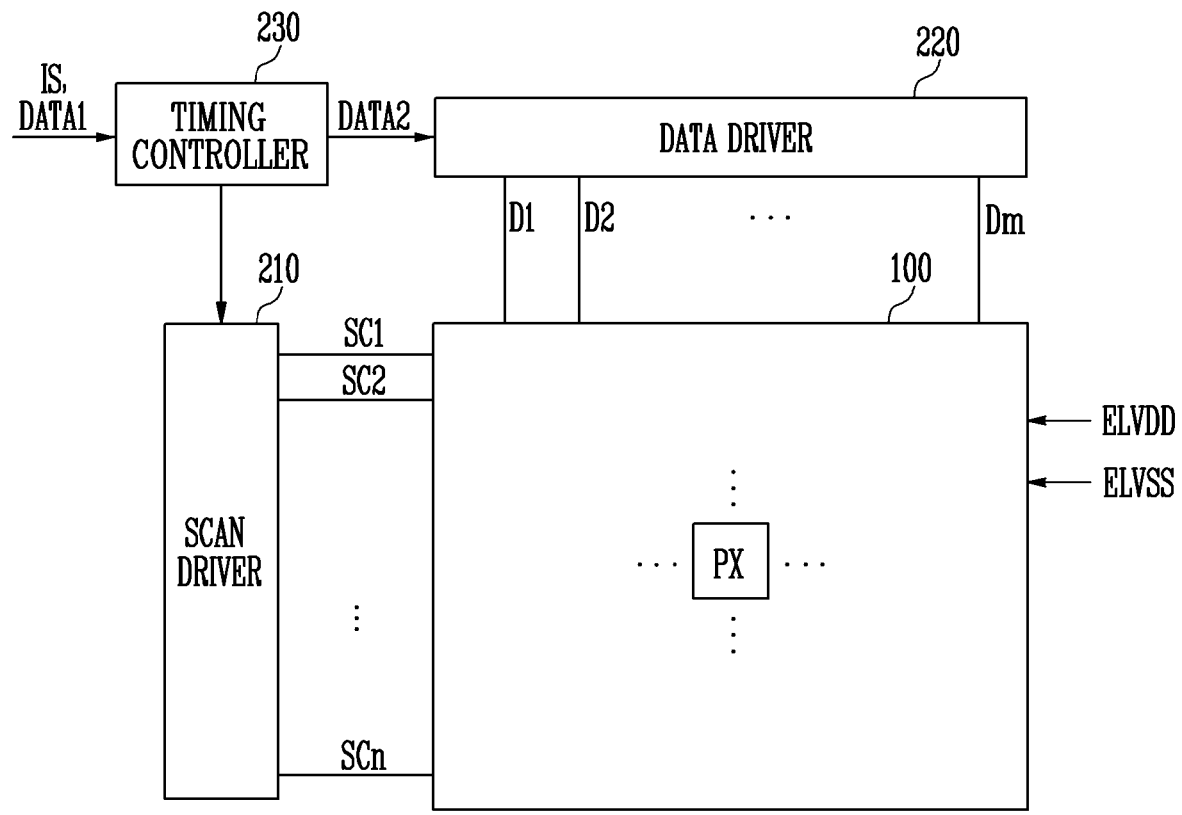
FIG. 1 is a block diagram illustrating a display device according to an embodiment of the present disclosure.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The display device or display devices and/or any other relevant devices or components, such a display panel including a plurality of pixels PX, a scan driver, a data driver, and a timing controller, according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device according to an embodiment of the present disclosure.

Referring to FIG. 1, the display device according to the embodiment of the present disclosure may include a display panel 100 including a plurality of pixels PX, a scan driver 210, a data driver 220, and a timing controller 230.

The timing controller 230 may generate a scan driving control signal, a data driving control signal, and a power driving control signal, based on a control signal IS input from an outside source (e.g., from an outside source such as a processor, GPU, or other source as would be understood by one skilled in the art).

The control signal IS that is input from the outside source may include, for example, auto current limit mode setting information, auto current limit update period information, High Brightness Mode (HBM) control information, and any other suitable information as would be understood by one skilled in the art. A more detailed example of the control signal IS will be described below with reference to FIG. 7.

The scan driving control signal generated by the timing controller 230 may be supplied to the scan driver 210, and the data driving control signal generated by the timing controller 230 may be supplied to the data driver 220.

The scan driving control signal may include a plurality of clock signals and a scan start signal. The scan start signal may control an output timing of a first scan signal. The clock signals may be used to shift the scan start signal.

A source start pulse and clock signals may be included in the data driving control signal. The source start pulse may control a sampling start time of data, and the clock signals may be used to control a sampling operation.

In various embodiments of the present disclosure, the timing controller 230 may receive input image data (e.g., first image data DATA1) from the outside source, and generate corrected image data (e.g., second image data DATA2) suitable for image display of the display panel 100. For example, the timing controller 230 may generate the second image data DATA2 by modulating (or reducing) the first image data DATA1 based on an on-pixel ratio of the display panel 100 and a preset reference on-pixel ratio.

The on-pixel ratio may be a ratio of a number of pixels PX activated based on the first image data with respect to a number of pixels PX in the display panel 100. In other words, the on-pixel ratio may be a ratio of a driving amount (i.e., a driving amount when pixels PX are driven based on the first image data) with respect to a maximum driving amount (i.e., a driving amount when all the pixels PX are driven based on a maximum grayscale value).

A more detailed operation of the timing controller 230 will be described below with reference to FIGS. 3-7.

The scan driver 210 may output scan signals corresponding to the scan driving control signal. The scan driver 210 may sequentially supply the scan signals to scan lines SC1 to SCn. The scan signals may be set to a gate-on voltage (e.g., a high level voltage) at which transistors included in the pixels PX can be turned on.

The data driver 220 may supply a data signal to data lines D1 to Dm, corresponding to the data driving control signal. The data signal supplied to the data lines D1 to Dm may be supplied to pixels PX to which the scan signals are supplied. The data driver 220 may supply the data signal to the data lines D1 to Dm in synchronization with the scan signal.

The display panel 100 may include a plurality of pixels PX coupled to the data lines D1 to Dm and the scan lines SC1 to SCn. Each of the pixels PX may be supplied with a data signal from a corresponding one of the data lines D1 to Dm when a scan signal is supplied to a corresponding one of the scan lines SC1 to SCn, which is coupled thereto. The pixel PX supplied with the data signal may control an amount of current flowing from a first power source ELVDD to a second power source ELVSS via a light emitting device (not shown), corresponding to the data signal. The light emitting device may generate light with a luminance (e.g., a predetermined luminance) corresponding to the amount of current. Additionally, the first power source ELVDD may be set to a voltage higher than that of the second power source ELVSS.

Figure 2:
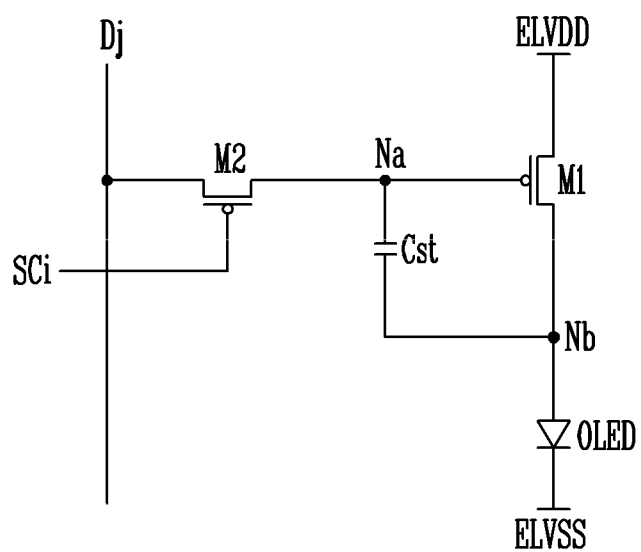
FIG. 2 is a diagram illustrating an embodiment of a pixel shown in FIG. 1.

FIG. 2 is a diagram illustrating an embodiment of the pixel shown in FIG. 1. For convenience of description, a pixel PX coupled to an ith scan line SCi and a jth data line Dj is illustrated in FIG. 2.

The pixel PX may include a driving transistor M1, a switching transistor M2, a storage capacitor Cst, and a light emitting device OLED.

The switching transistor M2 may include a first electrode coupled to the jth data line Dj, a gate electrode coupled to the ith scan line SCi, and a second electrode coupled to a first node Na.

The switching transistor M2 may be turned on when a scan signal is supplied to the ith scan line SCi, to supply a data signal received from the jth data line Dj to the storage capacitor Cst or to control a potential of the first node Na.

The storage capacitor Cst includes a first electrode coupled to the first node Na and a second electrode coupled to a second node Nb. The storage capacitor Cst may charge a voltage corresponding to the data signal.

The driving transistor M1 may include a first electrode coupled to a first power source ELVDD, a second electrode coupled to the light emitting device OLED, and a gate electrode coupled to the first node Na. The driving transistor M1 may control an amount of current flowing through the light emitting device OLED, corresponding to an inter-gate-source voltage value.

The light emitting device OLED may include a first electrode (e.g., an anode electrode) coupled to the second electrode of the driving transistor M1 and a second electrode (e.g., a cathode electrode) coupled to a second power source ELVSS. The light emitting device OLED may generate light corresponding to an amount of current supplied from the driving transistor M1.

In FIG. 2, the first electrode of each of the transistors M1 and M2 may be set as any one of a source electrode and a drain electrode, and the second electrode of each of the transistors M1 and M2 may be set as an electrode different from the first electrode. For example, when the first electrode is set as the source electrode, the second electrode may be set as the drain electrode.

In addition, the transistors M1 and M2 may be implemented with a PMOS transistor as shown in FIG. 2. However, the present disclosure is not limited thereto, and the transistors M1 and M2 may be implemented with an NMOS transistor.

Figure 3:
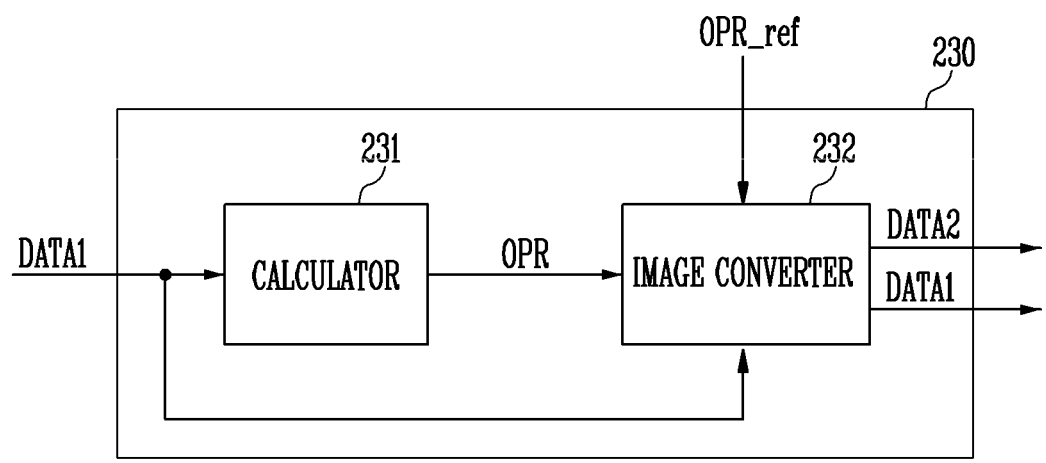
FIG. 3 is a block diagram illustrating an example of a timing controller shown in FIG. 1.
Figure 4:
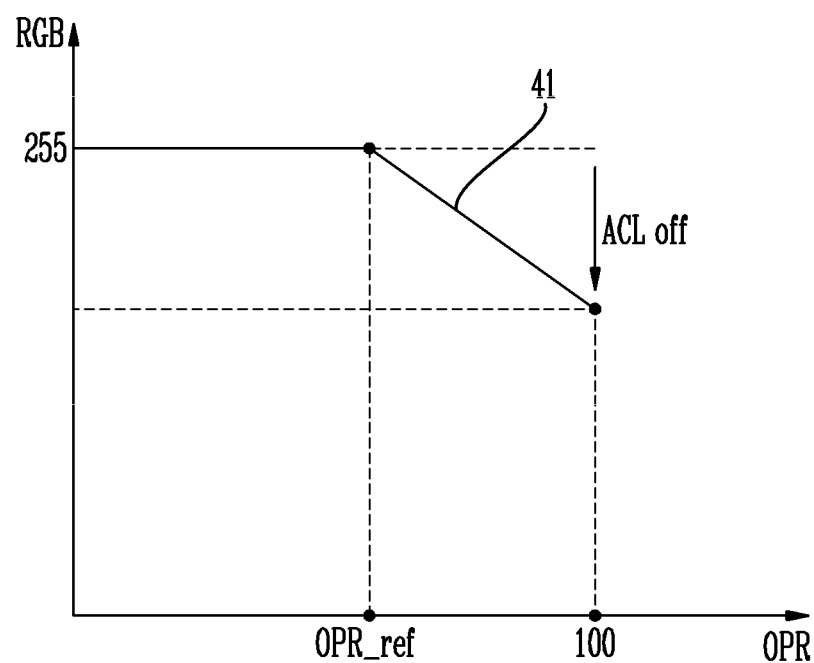
FIG. 4 is a diagram illustrating an example of a grayscale value in the timing controller of FIG. 3.

FIG. 3 is a block diagram illustrating an example of the timing controller shown in FIG. 1. FIG. 4 is a diagram illustrating an example of a grayscale value corrected by the timing controller of FIG. 3.

Referring to FIG. 3, the timing controller 230 according to the present disclosure may include a calculator 231 and an image converter 232.

The calculator 231 may calculate an on-pixel ratio OPR, based on input image data (e.g., first image data DATA1) and the number of pixels PX in the display panel 100. The on-pixel ratio OPR may be a ratio of a number of pixels PX activated based on the first image data with respect to a number of pixels PX provided in the display panel 100. In other words, the on-pixel ratio OPR may be ratio of a driving amount (i.e., a driving amount when pixels PX are driven based on the first image data) with respect to a maximum driving amount (i.e., a driving amount when all the pixels PX are driven based on a maximum grayscale value).

In an embodiment, the calculator 231 may calculate on-pixel ratios OPR in units of frames of image data. In another embodiment, the calculator 231 may calculate an on-pixel ratio OPR by accumulating on-pixel ratios in units of pixel rows on which image data is to be displayed. Alternatively, in an embodiment, the calculator 231 may calculate an on-pixel ratio OPR by accumulating on-pixel ratios in units of pixel rows in a first frame, and calculate on-pixel ratios OPR in units of frames from a second frame. The calculation unit of the on-pixel ratio OPR may be controlled by the control signal IS received from the outside source.

The calculator 231 may transfer the calculated on-pixel ratio OPR to the image converter 232. In an embodiment, when the calculator 231 calculates on-pixel ratios OPR in units of frames, the calculator 231 may transfer the on-pixel ratio OPR calculated with respect to each frame to the image converter 232.

In another embodiment, when the calculator 231 calculates on-pixel ratios OPR in units of pixel rows, the calculator 231 may transfer, to the image converter 232, an on-pixel ratio OPR obtained by accumulating on-pixel ratios with respect to preset N pixel rows (i.e., a first pixel row to an Nth pixel row) among the all the pixel rows. In an embodiment, the N may be set to a value corresponding to a half of all the pixel rows constituting the display panel 100, but the present disclosure is not limited thereto.

The image converter 232 generate image data (e.g., second image data DATA2), based on the on-pixel ratio OPR calculated by the calculator 231 and a reference on-pixel ratio OPR_ref (e.g., a preset reference on-pixel ratio). The reference on-pixel ratio OPR_ref is a reference value of the on-pixel ratio OPR with respect to whether a hardware or software auto current limit function has been performed.

In various embodiments, the reference on-pixel ratio OPR_ref may include a first reference on-pixel ratio OPR_ref1 for when on-pixel ratios are calculated in units of frames and a second reference on-pixel ratio OPR_ref2 for when on-pixel ratios OPR are calculated in units of pixel rows. In an embodiment, the second reference on-pixel ratio OPR_ref2 may be less (e.g., by setting smaller) than the first reference on-pixel ratio OPR_ref1. For example, the second reference on-pixel ratio OPR_ref2 may be half of the first reference on-pixel ratio OPR_ref1. However, the present disclosure is not limited thereto.

When the calculated on-pixel ratio OPR is less than or equal to the reference on-pixel ratio OPR_ref, the image converter 232 does not correct the input image data (e.g., the first image data DATA1) but may output the input image data without modification (e.g., as it is received).

When the calculated on-pixel ratio OPR is larger than the reference on-pixel ratio OPR_ref, the image converter 232 may generate and output the image data (e.g., the second image data DATA2) by correcting the input image data (e.g., the first image data DATA1). The correction of the input image data may include an operation of adjusting the size of the image data by reducing the input image data by a specific value or by multiplying the input image data by a specific correction coefficient. The correction coefficient may increase in proportion to, for example, the difference between the calculated on-pixel ratio OPR and the reference on-pixel ratio OPR_ref.

Referring to FIG. 4, a correction curve 41 shows a change in maximum grayscale value included in the input image data, based on the on-pixel ratio OPR.

The maximum grayscale value (e.g., grayscale value 255) included in the input image data may be corrected according to the correction curve 41. For example, when the on-pixel ratio OPR is less than or equal to the reference on-pixel ratio OPR_ref, the maximum grayscale value included in the input image data may be mapped to the grayscale value 255. That is, the maximum grayscale value included in the input image data may not be corrected.

When the on-pixel ratio OPR is larger than the reference on-pixel ratio OPR_ref, the maximum grayscale value included in the image data may be corrected to a grayscale value smaller than the grayscale value 255 due to a decrease in correction coefficient (e.g., to a specific grayscale value). The display device can reduce power consumption by using a correction coefficient included in first input image data.

Hereinafter, in the present disclosure, a method for performing an auto current limit when on-pixel ratios OPR are calculated in units of pixel rows will be described in detail.

Figure 5:
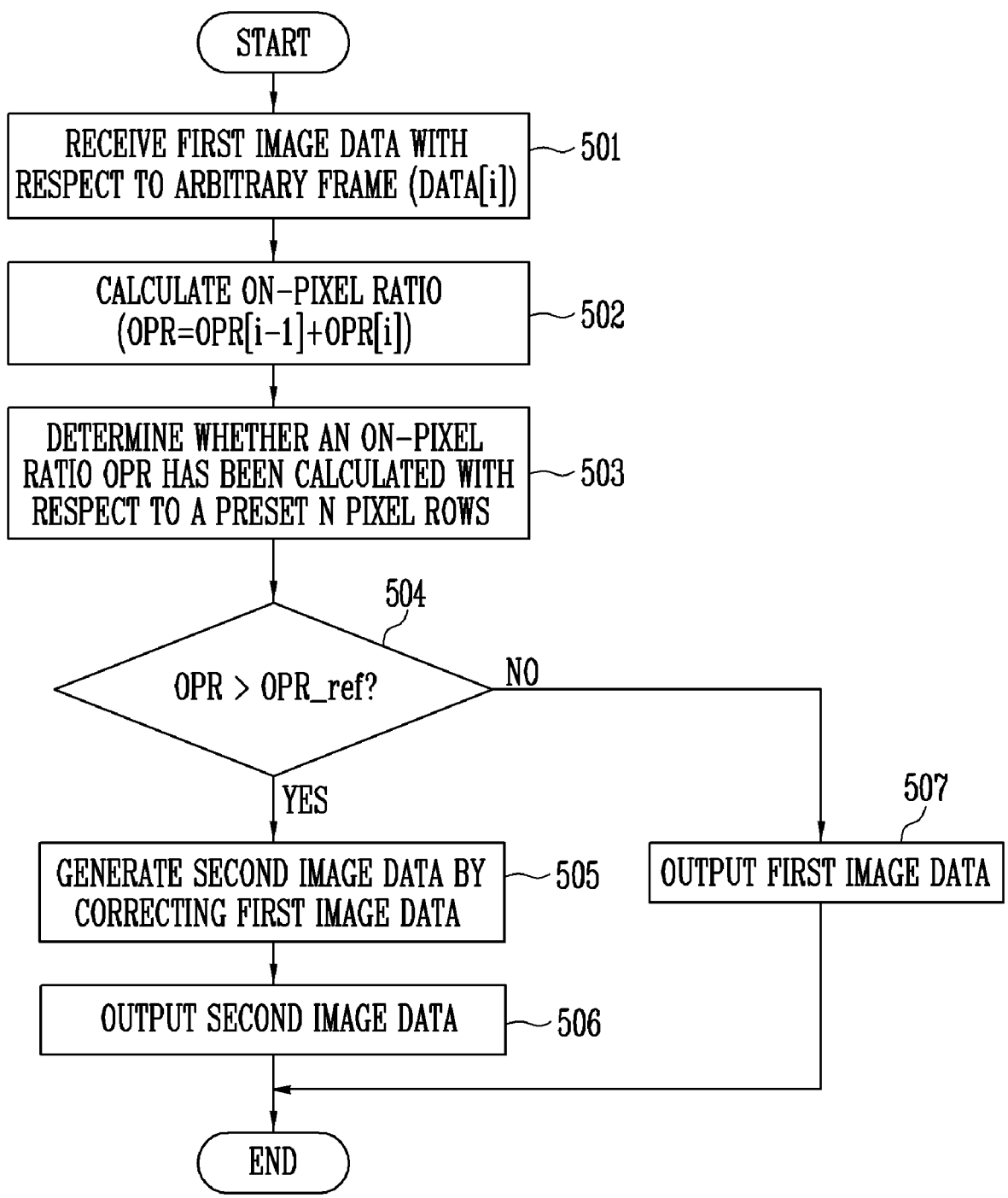
FIG. 5 is a flowchart illustrating a driving method of the display device according to an embodiment of the present disclosure.
Figure 6:
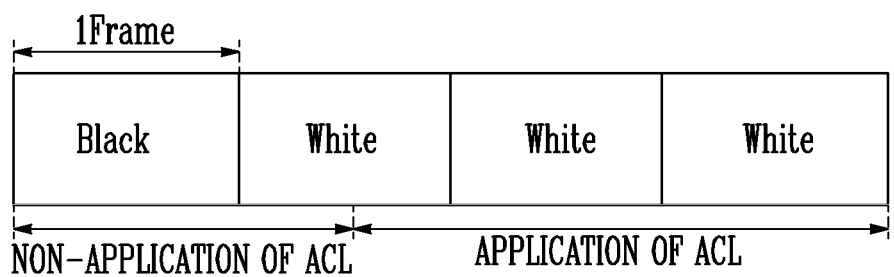
FIG. 6 is a diagram illustrating a driving method of the display device according to an embodiment of the present disclosure.

FIG. 5 is a flowchart illustrating a driving method of the display device according to an embodiment of the present disclosure. FIG. 6 is a diagram illustrating a driving method of the display device according to an embodiment of the present disclosure.

Referring to FIGS. 1, 5, and 6, the timing controller 230 of the display device according to the present disclosure receives first image data with respect to an arbitrary frame from the outside source (501). In an embodiment, the timing controller 230 may receive first image data in units of pixel rows in the arbitrary frame. In this embodiment, the timing controller 230 may receive first image data with respect to an ith pixel row.

However, the present disclosure is not limited thereto. That is, in another embodiment, the timing controller 230 may receive input image data with respect to the arbitrary frame, and extract first image data with respect to the ith pixel row in the received input image data.

In an embodiment, the arbitrary frame may be a first frame of an image. In this embodiment, an auto current limit (ACL) in units of frames instead of an auto current limit in units of pixel rows, which will be described later, may be applied to the other frames from a second frame. However, the present disclosure is not limited thereto.

When the first image data is received, the timing controller 230 may calculate an on-pixel ratio OPR (502). The timing controller 230 may accumulate an on-pixel ratio OPR of the received first image data to an on-pixel ratio OPR of a corresponding frame, which has been determined up to the present, and calculate the accumulated on-pixel ratio OPR.

In the present disclosure, since the timing controller 230 receives first image data in units of pixel columns, the timing controller 230 calculates an on-pixel ratio OPR in units of pixel columns. Accordingly, the timing controller 230 may calculate an on-pixel ratio OPR by accumulating on-pixel ratios OPR of image data with respect to i pixel rows.

The timing controller 230 may determine whether an on-pixel ratio OPR has been calculated with respect to a preset N pixel rows (503). That is, the timing controller 230 may determine whether i=N, where N is a natural number of 2 or more, and may be set to, for example, a value corresponding to a half of all the pixel rows constituting the display panel 100. However, the present disclosure is not limited thereto.

In various embodiments, when the on-pixel ratio OPR is not calculated with respect to the preset N pixel rows (i.e., i<N), the timing controller 230 may repeat the above-described operation until an on-pixel ratio OPR accumulated with respect to the N pixel rows is calculated.

In various embodiments, when the on-pixel ratio OPR is calculated with respect to the preset N pixel rows (i.e., i=N), the timing controller 230 may determine whether the calculated on-pixel ratio OPR is larger than a preset reference on-pixel ratio OPR_ref (504). The reference on-pixel ratio OPR_ref is a reference value of the on-pixel ratio OPR with respect to whether a hardware or software auto current limit function has been performed.

When the calculated on-pixel ratio OPR is larger than the reference on-pixel ratio OPR_ref, the timing controller 230 may generate second image data by correcting the first image data (505). For example, the timing controller 230 may generate the second image data by adjusting the size of the first image data by reducing first image data with respect to the ith pixel row by a value (e.g., a specific value) or by multiplying the first image data by a correction coefficient (e.g., a specific correction coefficient). The correction coefficient may increase in proportion to the difference between the calculated on-pixel ratio OPR and the reference on-pixel ratio OPR_ref.

The timing controller 230 may output the second image data generated as described above (506). The timing controller 230 may provide the second image data to the data driver 220, to allow an image corresponding to the second image data to be displayed on the display panel 100.

In various embodiments, when the auto current limit is generally applied in units of frames, an on-pixel ratio OPR is calculated with respect to input image data of an arbitrary frame, and the auto current limit is performed corresponding to on-pixel ratios OPR calculated with respect to frames from a frame next to the corresponding frame. However, in the present disclosure, on-pixel ratio OPR with respect to the input image data is calculated in units of pixel rows as described above. Therefore, as shown in FIG. 6, the auto current limit may be applied (e.g., immediately applied) with respect to at least some pixel rows even in the first frame to which the auto current limit is applied. Accordingly, in the present disclosure, the power consumption of the display device can be efficiently reduced, and the quality of an image can be improved.

In various embodiments, when the calculated on-pixel ratio OPR is not larger than the reference on-pixel ratio OPR_ref, the timing controller 230 may output the first image data as it is (507).

Figure 7:
FIG. 7 is a diagram illustrating an example of a control signal provided to the timing controller of FIG. 3.

FIG. 7 is a diagram illustrating an example of a control signal provided to the timing controller of FIG. 3.

Referring to FIGS. 1 and 7, the timing controller 230 receives a control signal IS from the outside source. As shown in FIG. 7, the control signal SI may include auto current limit mode setting information ACL_HBM_Update, auto current limit update period information ACL_HBM_Update_Period, HBM control information HBM_CON, and the like as would be understood by one skilled in the art.

In various embodiments, the auto current limit mode setting information ACL_HBM_Update includes information for setting whether the auto current limit is to be performed in units of frames or in units of pixel rows. For example, in an embodiment, when the value of the auto current limit mode setting information ACL_HBM_Update is set to 0, the auto current limit may be performed in units of frames. When the value of the auto current limit mode setting information ACL_HBM_Update is set to 1, the auto current limit may be performed in units of pixel rows. When the auto current limit may be performed in units of frames, on-pixel ratios may be calculated in units of image data with respect to one frame. When the auto current limit may be performed in units of pixel rows, on-pixel ratios may be calculated in units of image data with respect to one pixel row.

In various embodiments, the auto current limit update period information ACL_HBM_Update_Period may define a number of pixel rows to which the auto current limit is to be performed. In an embodiment, when the auto current limit update period information ACL_HBM_Update_Period is set to a natural number of 2 or more, the auto current limit using the same correction coefficient may be applied with respect to a plurality of pixel rows.

In various embodiments, the HBM control information HBM_CON may include information for setting enable/disable of an HBM. In an embodiment, when the HBM is set to be enable, the auto current limit may be performed.

The control signal IS provided to the timing controller 230 is not limited to that described above. That is, in various embodiments, the control signal IS may not include at least some of the above-described components, or may further include required additional information as would be understood by those skilled in the art.

In various embodiments, the display device and the driving method thereof according to the present disclosure, may reduce the deterioration of the display. For example, when the display is turned on/off, the on/off of the display panel is gradually performed when the auto current limit is applied in the HBM. Thus, the deterioration of display quality that may be viewed by a user can be reduced or minimized.

Further, in the display device and the driving method thereof according to the present disclosure, the power consumption of the display device can be reduced, and the quality of an image can be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims and their equivalents.

What is claimed is:

1. A display device comprising:
a display panel comprising a plurality of pixels;
a timing controller configured to calculate an On-Pixel Ratio (OPR) of input image data with respect to an arbitrary frame, and to correct the input image data, based on the OPR; and
a data driver configured to generate a data signal based on the corrected input image data, and to provide the data signal to the display panel,
wherein the OPR is calculated in units of pixel rows,
wherein the timing controller is configured to calculate the OPRs in units of pixel rows when the arbitrary frame is a first frame of an image to be displayed on the display panel, and
wherein the timing controller is configured to calculate the OPRs in units of frames when the arbitrary frame is not the first frame.

2. The display device of claim 1, wherein the timing controller is configured to calculate the OPR of the input image data with respect to N pixel rows, and to correct the input image data based on the calculated OPR, wherein N is a natural number of 2 or more.

3. The display device of claim 2, wherein the N is a natural number corresponding to a half of all of the pixel rows of the display panel.

4. The display device of claim 1, wherein the timing controller is configured to correct the input image data and to provide the corrected input image data to the data driver when the OPR is larger than a reference OPR.

5. The display device of claim 1, wherein the timing controller is configured to provide the input image data to the data driver without correcting the input image data when the OPR is less than or equal to a reference OPR.

6. The display device of claim 1, wherein the arbitrary frame is the first frame of the image to be displayed on the display panel.

7. The display device of claim 6, wherein the timing controller is configured to correct the input image data based on an OPR calculated in an (i-1)th frame with respect to an ith frame after the first frame, wherein i is a natural number of 2 or more.

8. The display device of claim 7, wherein the timing controller is configured to correct the input image data based on whether the OPR is larger than a first reference OPR for the first frame and to correct the input image data based on whether the OPR is larger than a second reference OPR for the ith frame.

9. A method for driving a display device having a display panel comprising a plurality of pixels, the method comprising:
calculating On-Pixel Ratios (OPRs) of input image data with respect to an arbitrary frame in units of pixel rows;
correcting the input image data, based on the OPRs; and
providing a data signal corresponding to the corrected input image data to the display panel,
wherein the calculating of the OPRs of the input image data in units of pixel rows comprises:
when the arbitrary frame is a first frame of an image to be displayed on the display panel, calculating the OPRs in units of pixel rows; and
when the arbitrary frame is not the first frame, calculating the OPRs in units of frames.

10. The method of claim 9, wherein the correcting of the input image data comprises:
determining whether an OPR of the input image data with respect to N pixel rows has been calculated, wherein N is a natural number of 2 or more; and
when the OPR of the input image data with respect to the N pixel rows is calculated, correcting the input image data, based on the OPR.

11. The method of claim 10, wherein the N is a natural number corresponding to a half of all of the pixel rows of the display panel.

12. The method of claim 9, wherein the correcting of the input image data comprises:
determining whether an OPR is larger than a reference OPR; and
when the OPR is larger than the reference OPR, correcting the input image data and providing the corrected input image data to the display panel.

13. The method of claim 9, wherein the correcting of the input image data comprises:
determining whether an OPR is larger than a reference OPR; and
providing the input image data to the display panel without correcting the input image data when the OPR is not larger than the reference OPR.

14. The method of claim 9, wherein the correcting of the input image data comprises:
correcting the input image data, based on an OPR calculated with respect to N pixel rows in the arbitrary frame when the arbitrary frame is the first frame; and
correcting the input image data, based on an OPR calculated in a frame before the arbitrary frame when the arbitrary frame is not the first frame.

15. The method of claim 14, wherein the correcting of the input image data comprises:
correcting the input image data, based on whether the OPR calculated with respect to the N pixel rows in the arbitrary frame is larger than a first reference OPR when the arbitrary frame is the first frame; and
correcting the input image data, based on whether the OPR calculated in the frame before the arbitrary frame is larger than a second reference OPR when the arbitrary frame is not the first frame.

* * * * *